(12) United States Patent
Tarasoff

(10) Patent No.: US 9,933,237 B2
(45) Date of Patent: Apr. 3, 2018

(54) PRESSURE IMPULSE MITIGATION

(71) Applicant: BIODYNAMIC ARMOR LTD, London (GB)

(72) Inventor: Leonid Tarasoff, Stanmore (AU)

(73) Assignee: BIODYNAMIC ARMOR LTD, London (GB)

( * ) Notice: Subject to any disclaimer, the term of this patent is extended or adjusted under 35 U.S.C. 154(b) by 0 days.

(21) Appl. No.: 14/902,377

(22) PCT Filed: Jul. 1, 2014

(86) PCT No.: PCT/GB2014/051987
§ 371 (c)(1),
(2) Date: Dec. 31, 2015

(87) PCT Pub. No.: WO2015/001326
PCT Pub. Date: Jan. 8, 2015

(65) Prior Publication Data
US 2016/0290768 A1 Oct. 6, 2016

(30) Foreign Application Priority Data

Jul. 1, 2013 (GB) .................................. 1311771.8

(51) Int. Cl.
| | | |
|---|---|---|
| *F41H 5/007* | (2006.01) | |
| *C08H 1/06* | (2006.01) | |
| *C08J 3/075* | (2006.01) | |
| *C08J 3/24* | (2006.01) | |
| *F42D 5/045* | (2006.01) | |
| *G01P 5/26* | (2006.01) | |
| *G01S 17/58* | (2006.01) | |
| *G01S 17/95* | (2006.01) | |
| *C08L 89/06* | (2006.01) | |
| *F03D 17/00* | (2016.01) | |

(52) U.S. Cl.
CPC ............... *F41H 5/007* (2013.01); *C08H 1/06* (2013.01); *C08J 3/075* (2013.01); *C08J 3/24* (2013.01); *C08L 89/06* (2013.01); *F03D 17/00* (2016.05); *F42D 5/045* (2013.01); *G01P 5/26* (2013.01); *G01S 17/58* (2013.01); *G01S 17/95* (2013.01); *C08J 2389/04* (2013.01); *F05B 2270/32* (2013.01); *F05B 2270/804* (2013.01)

(58) Field of Classification Search
CPC .. F41H 5/007; C08H 1/06; C08J 3/075; C08J 3/24; C08J 2389/04; G01S 17/58; G01S 17/95; G01P 5/26; F03D 17/00; F42D 5/045; F05B 2270/32; F05B 2270/804
USPC ........ 89/36.01–36.17; 109/58, 78, 80, 82–84
See application file for complete search history.

(56) References Cited

U.S. PATENT DOCUMENTS

| 6,444,227 B1* | 9/2002 | Leuenberger ........ A61K 9/1658 424/484 |
| 6,667,279 B1* | 12/2003 | Hessert .................... C08L 1/26 507/209 |
| 2009/0175946 A1* | 7/2009 | Gaissmaier ........... A61L 24/104 424/484 |

FOREIGN PATENT DOCUMENTS

| AU | 2011203138 A1 | 7/2011 |
| JP | 2007028955 A | 2/2007 |
| WO | 2006/114597 A2 | 11/2006 |
| WO | 2006/125969 A1 | 11/2006 |
| WO | 2013/076056 A1 | 5/2013 |

OTHER PUBLICATIONS

International Search Report and Written Opinion—PCT/GB2014/051987—dated Dec. 16, 2014.

* cited by examiner

*Primary Examiner* — Bret Hayes
(74) *Attorney, Agent, or Firm* — Banner & Witcoff, Ltd.

(57) ABSTRACT

A pressure impulse mitigating barrier including a crosslinked gel, the gel including water and gelatin which has been crosslinked using a functional silane compound, the compound including an electrophilic group (where the electrophilic group is not a silane) and a group of formula (B) where R is a $C_{1-10}$ alkyl group, $C_{6-10}$ aryl group, or $C_{7-12}$ arylalkyl group; R' is a $C_{1-10}$ alkyl group, $C_{6-10}$ aryl group, or $C_{7-12}$ arylalkyl group; n is 0-1, and where the functional silane has Mw of 800 g/mol or less.

14 Claims, No Drawings

PRESSURE IMPULSE MITIGATION

CROSS-REFERENCE TO RELATED APPLICATIONS

This application is a U.S. National Stage application under 35 U.S.C. § 371 of International Application PCT/GB2014/051987 (published as WO 2015/001326 A1), filed Jul. 1, 2014, which claims priority to Application GB 1311771.8, filed Jul. 1, 2013. Benefit of the filing date of each of these prior applications is hereby claimed. Each of these prior applications is hereby incorporated by reference in its entirety.

TECHNICAL FIELD

This disclosure relates to a new material to be used as a pressure mitigant, e.g. as a protective barrier such as an armour. In particular, the disclosure relates to the use of certain cross-linked gelatins to form a material which can mitigate the consequences of an explosion and/or damage caused by projectiles.

Since the mid 1990's there has been an increase in the use of explosives by criminal organisations against civilian and military targets throughout the World. Their use results in death, injury and destruction of property and buildings. Previously, mitigation of explosion relied upon intelligence and police detection to provide warning of impending attack but recent events make it clear that intelligence and police operations alone cannot be relied upon to prevent explosions. Moreover, some explosions are caused simply by accident, e.g. gas or chemical explosions, and it would be useful if the consequences of such accidental explosions could also be minimised.

Previously, we have proposed the use of cross-linked water gels in pressure impulse mitigation. Without wishing to be limited by theory, it is envisaged that the inherent elasticity of the cross-linked water gel makes it an excellent material for absorbing the shockwave of an explosion whilst retaining its structural integrity. Moreover, the aqueous nature of the water gel ensures that it is also capable of resisting heat and quenching flame, in particular in the immediate aftermath of an explosion.

In addition, the cross-linked water gels mitigate damage caused by projectiles such as shrapnel or bullets. The water gels are able to absorb and partially redirect the shockwave created by the projectile through their elasticity whilst also acting to slow and potentially stop the projectile via friction effects throughout the gel bulk. The cross-linked water gels therefore also serve to protect against damage from projectiles and are hence of use as bullet proof materials.

WO2006/114597 proposed the use of certain multifunctional cross-linkers to crosslink gelatin in order to form materials suitable for pressure impulse mitigation. The cross-linkers used are typically bifunctional or multifunctional organic molecules such as dissuccinimidyl suberate. Whilst these gels have shown remarkable properties, in particular in terms of anti-ballistic performance, there remains a need for improvements on the technology set out in this application.

In WO2006/125969, we proposed methods of improving the strength of gelatin based armours by combining the optionally cross-linked gels with other layers such as layers made from ceramic particles. We also proposed the use of a "bubble wrap" type surface structure to improve performance by deflecting incoming projectiles and encouraging them to spin or alter their axis of travel.

There are however, still further improvements needed to the water gels already provided. In particular, the present inventors sought to increase the melting point of the cross-linked water gels to ensure that the gels could be used successfully as armour in areas of extreme heat, such as the middle east. One problem with water gels is their melting points. Any tendency of the gel to melt may jeopardise its pressure mitigating strength.

There is also a need to strengthen the gels to further improve anti-ballistic performance, e.g. at higher temperature.

There is also a need to improve adhesion between the gel and a layer of ceramic or other boundary layer often used to further strengthen the armour. It is important to avoid delamination of armour. We have found that the use of certain functional silanes improve the adhesion between a layer of silane crosslinked gel and a ceramic layer in an armour.

Thus, the present inventors sought new cross-linkers to provide cross-linked gelatins that have improved properties over those previously disclosed, in particular in terms of higher melting point and adhesion to ceramic layers in the gel.

The present inventors have found that using silane based cross-linkers such as epoxysilanes, cross-linked gels can be provided with much higher melting points than those achieved using the multifunctional cross-linking agents of WO2006/114597. Whilst the use of epoxides is mentioned in WO2006/114597 as one type of reactive functionality and the compound bisphenol A diglycidyl ether is one suggested option, there is no suggestion of the use of silanes or indeed epoxysilanes. We have found these to offer improved properties in the formed gel, in particular in terms of melting point.

Without wishing to be limited by theory, we believe that the use of epoxy silanes and other related functional silanes is advantageous as the silane itself does not react readily (or react under the conditions of addition) with the gelatin. This means that the functional silanes are not really "bifunctional" crosslinkers, as in WO2006/114597, but rather monofunctional crosslinkers. Overtime however the inventors have observed slow hydrolysis of the silane functionality and hence the generation of hydroxyl groups which can form a network of bonds with other cross-linkers, other additives as described below and with the gelatin to form a cross-linked material. This material possess a very high melting point.

The use of the functional silanes of the disclosure is also interesting as free hydroxyl groups present at the surface of a ceramic layer within an armour of the disclosure can react with the functional group to create a link between gel and ceramic. This helps prevent delamination of the armour in theatre.

As an alternative the use of silanes, we have also found that the use of certain transition metal compounds can provide useful properties in terms of cross-linking and melting point without any detriment to gel anti-ballistic performance. In particular, the use of Cr or Al ion containing compounds s in cross-linking agents can increase melting point.

The partially inorganic nature of these cross-linkers in an otherwise organic gel may well be the reason for the increases in melting point which we observe.

We also suggest the possibility of an microbiological approach using enzymes such as TGA.

SUMMARY

Thus, viewed from one aspect the disclosure provides a pressure impulse mitigating barrier comprising a cross-linked gel comprising water and gelatin which has been crosslinked using:

(I) a functional silane compound comprising an electrophilic group (which is not a silane) and a group of formula (A)

where R is H, a $C_{1-10}$ alkyl group or $C_{6-10}$ aryl group, or $C_{7-12}$ arylalkyl group;

R' is $C_{1-10}$ alkyl group, $C_{6-10}$ aryl group, or $C_{7-12}$ arylalkyl group;

n is 0-2;

with the proviso that at least one R is not H;

said functional silane having an Mw of 800 g/mol or less;

(II) a transition metal, lanthanide or Al compound; or (III) an enzyme such as transglutaminase.

Viewed from another aspect the disclosure provides a process for the preparation of the a pressure impulse mitigating barrier comprising adding a functional silane as hereinbefore defined to a gelled mixture comprising gelatin and water;

allowing a cross-linking reaction to take place over a period of 3 days or more so as to crosslink said gel.

Viewed from another aspect the disclosure provides a method for protecting an entity, e.g. a structure or organism, from the effects of an explosion or from the effects of contact with a projectile comprising covering at least a part, preferably at least 10% thereof, e.g. all of said entity in a barrier as hereinbefore defined.

Viewed from another aspect the disclosure provides the use of a barrier as hereinbefore defined in pressure impulse mitigation.

DETAILED DESCRIPTION

By pressure impulse mitigation is meant, inter alia, that at least one of the effects, preferably all of the effects of an explosive blast, e.g. fragmentation or collapse of buildings or glass, translation of objects within the building and primary and secondary effects of fire are reduced.

Pressure impulse mitigation also covers mitigating the effects of contact with a projectile, i.e. mitigating the potential damage caused by a projectile or in the mitigation of projectile induced damage. The projectile may be, for example, a bullet, missile, shrapnel, space debris etc.

By entity is meant anything which should be protected from the impact of an explosion or from damage by a projectile, e.g. structures, organisms and the general physical environment.

An organism is a living plant or animal, e.g. a human. By structure is meant any inanimate object which could be protected from explosive damage such as buildings (temporary or permanent), industrial plant, civil infrastructure, vehicles, military equipment, computers etc.

The cross-linked gels of examples of the disclosure form a solid elastomeric barrier. They should exhibit elastomeric properties, have a high elastomeric modulus and a high ductility.

The gels are based on the cross-linking of gelatin. Any gelatin source can be used in the disclosure. Preferably, the gelatin used in examples of the disclosure has a molecular weight range of 20,000 to 300,000 D, e.g. 20,000 to 150,000 D and can be made from the hydrolysis of collagen. Ideal gelatins have bloom numbers from 250 to 350, such as 290 to 320.

In order to form a cross-linked gel with gelatin, the gelatin must be formed into a water gel. The gelatin is dissolved in an amount of water. The mixture of water and gelatin can comprise at least 3% by weight of the gelatin, preferably at least 4% by weight gelatin, especially at least 5% by weight gelatin, up to the limit of solubility of the gelatin in water (at 25° C.), e.g. between 10% by weight and 50% by weight of gelatin, or in the range 15% by weight to 40% by weight gelatin, e.g. 25 to 37% wt gelatine in water.

It will be appreciated that any gel of the disclosure can be provided with standard additives to preserve the gel and prevent degradation, e.g. from UV light, heat, oxygen and so on.

The gels of examples of the disclosure preferably contain at least one paraben stabiliser, such as methyl paraben or propyl paraben. In a further preferred embodiment, a mixture of paraben stabilisers can be employed.

Other stabilisers of interest are phenoxyalcohols such as phenoxyethanol.

In order to protect the barrier material against degradation by, for example, bacteria or light it may be essential to mix the water gels with antibacterials (e.g. sodium azide) or proteinase inhibitors such as EDTA (e.g. at 5 mM concentration), detergents and/or antioxidants as additives in the gel formulations. Other additives include colouring agents to produce a tinted product, emulsifiers, viscosity modifiers, and organic additives (such as xanthum gum, starch), can be employed.

It is preferred if the amount of stabilisers, in total is less than 1.5 wt % of the cross-linked gel. It may be preferable to add stabilisers to the gelatin and water before the cross-linking reaction is effected, i.e. before gellation. This ensures dispersion of the stabilisers throughout the formed gel.

Crosslinking Agents

The cross-linking agents of most interest in the present disclosure are "functional" silanes such as epoxysilanes. The term "functional" is used herein to define the presence of an electrophilic group that is capable of reacting with gelatin. Ideally that electrophilic group is therefore a leaving group or contains a group like an epoxide which readily reacts with nucleophilic groups such as OH in the gelatin. It is believed that in order to achieve the increases in melting point of the gel that are desired here, we need the electrophile in the functional silane. Note of course that the electrophilic group cannot be a silane.

Note that the silane part of the cross-linker does not immediately react with the gelatin on contact with the gelatin. It is thus preferred if the silane does not react with gelatin (under the conditions of the reaction) whereas the functional group should do so. The functional silanes of examples of this disclosure are not therefore conventional crosslinking agents with two reactive functional groups but rather have a single gelatin reactive functional group.

The cross-linker is thus monofunctional with respect to gelatin. The functional group is preferably an electrophile. That group may be, for example, selected from epoxide, tosyl, mesyl, halo, isothiocyanate, maleamides, dichlorotriazines, vinyl, carboxyl group, ester, acyl halide, acyl azide, anhydride isocyanate, or aldehyde. The skilled person will be aware of other possible electrophiles of utility here.

More preferably the functional group is epoxy, vinyl or carboxyl group based. Of course, the electrophilic group may contain a combination of these groups such as in an alpha-beta unsaturated carbonyl compound.

In a most preferred embodiment, the functional group is an epoxy group and that epoxy group is preferably terminal in the functional silane. It is at the opposite end of the molecule to the silane. The silane is also preferably terminal. Thus, a preferred compound features the functional group at one end and the silane at the other connected by a linking group.

The functional silanes comprise at least a group

$$-SiR'_n(OR)_{3-n} \qquad (A)$$

where R is H, a $C_{1-10}$ alkyl group, $C_{6-10}$ aryl group, or $C_{7-12}$ arylalkyl group;

R' is $C_{1-10}$ alkyl group, $C_{6-10}$ aryl group, or $C_{7-12}$ arylalkyl group;

n is 0-2;

with the proviso that at least one R is not H.

Ideally, R is not H. R is preferably a C1-6-alkyl. R' is preferably a C1-6 alkyl.

Preferably, the silane is a group:

$$-SiR'_n(OR)_{3-n} \qquad (B)$$

wherein R is a $C_{1-10}$ alkyl group, $C_{6-10}$ aryl group, or $C_{7-12}$ arylalkyl group;

R' is $C_{1-10}$ alkyl group or $C_{6-10}$ aryl group, or $C_{7-12}$ arylalkyl group;

n is 0-1.

More preferably, the silane is a group:

$$-Si(OR)_3 \qquad (C)$$

wherein R is a $C_{1-10}$ alkyl group, $C_{6-10}$ aryl group, or $C_{7-12}$ arylalkyl group, ideally a $C_{1-6}$ alkyl.

In a preferred embodiment therefore, the functional silane is an epoxy silane and should comprise at least one epoxide group and at least one $-Si(OR)_3$ group linked by a linking group.

Preferred functional silanes are of low molecular weight such as less than 700 g/mol, preferably less than 500 g/mol, especially less than 400 g/mol.

The functional group and the silane moiety are preferably connected by a linker group such as an alkylene chain optionally interrupted by one or more heteroatoms selected from O, NH and S. The linker group is preferably an alkylene chain or ether linker. It will be appreciated that the linker might contain a ring in the backbone of the molecule.

The presence of a hydrophilic component in the spacer such as an oxygen unit is preferred.

The linker is preferably 3 to 10 atoms in length. Alternatively viewed, the linker group ideally forms a link of from 1.5 to 70 Angstroms.

Preferred functional silanes are therefore of formula (I)

$$X\text{-}L\text{-}SiR'_n(OR)_{3-n} \qquad (I)$$

such as of formula

(I')

wherein each R is independently a H, C1-10 alkyl group, C6-10 aryl group or C7-12 arylalkyl group, wherein at least one R is not H;

R' is independently a H, C1-10 alkyl group, C6-10 aryl group or C7-12 arylalkyl group;

n is 0 to 2;

L is a linker which is an optionally unsaturated alkylene chain, alkylene ring or an alkylene chain and ring, in which any chain or ring is optionally interrupted by one or more heteroatoms selected from O, N or S and/or groups of atoms CO, —COO—, —OCO—, —NHCO—, —CONH—;

X can be H where a double bond is present or where there is no double bond,

X is an epoxide.

It is especially preferred if L is an alkylene chain, the double bond is present and X is H thus forming a vinyl silane.

In a further preferred embodiment, epoxysilanes of interest are those of formula (III):

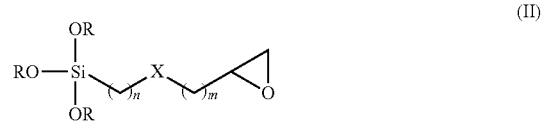
(II)

wherein each R is independently a C1-6 alkyl group;

n is 1 to 4 m is 1 to 4; and

X is CH, S or O.

Preferably X is O. Preferably m is 1. Preferably n is 1. Preferably all R groups are the same. Preferably R is methyl or ethyl.

It will be appreciated that the rate of hydrolysis of the alkoxysilane depends on the size of the R group and on the number of groups present. Generally therefore the larger the group the slower the hydrolysis. The use of branching slows hydrolysis still further; e.g. slower OiPr>OPr>OEt>OMe faster.

Of course, it will be possible to use a mixture of different functional silane cross-linking agents.

The amount of functional silane added in the gel as a whole may range from 0.1 to 5 wt %, such as 0.5 to 2 wt %. The functional silane to gelatin ratio is ideally 0.005 to 0.1.

An important benefit of the use of the epoxysilane cross-linkers is the fact that the cross-linking reaction takes place in the actual gel as opposed to in a liquid (so as to form a gel). Crosslinking in the gel phase reinforces the natural physical thermoreversible network of gelatin gel with a second network of covalent bonds. The resulting gels are no longer thermo-reversible (i.e. they have a high melting point).

A further benefit of the use of an epoxysilane compound is its apparent adhesion to a ceramic surface. The first step in the adhesion of silanes to ceramic surfaces is in the hydrolysis of the alkoxy groups on the silane to give a hydroxysilane. That may take place under mildly acid conditions for example. This binds the hydroxyl groups on the ceramic substrate via hydrogen bonds. On heating, covalent links with the ceramic surface occur. Also, links between adjacent functional silanes can also form by conventional chemistry strengthening the links in the forming crosslinked gel.

Further Additive

In a further preferred embodiment, the functional silanes of the disclosure can be combined with a silanol compound or, more likely, a compound that readily hydrolyses to form a silanol compound, to form an additional linker structure.

The addition of a silanol compound, or precursor therefore, provides the opportunity to increase the length of each cross-linking unit within the gel.

One problem encountered by the artisan when trying to crosslink a water based gel such as gelatin gel is that longer crosslinkers are typically poorly water soluble and do not therefore work well in a water gel structure. By using the combination of a functional silane and a silanol compound or precursor thereof, we offer the chance to generate longer crosslinkers in situ within the gel.

Suitable silanol compounds or precursors therefore generate units of formula —OSiR$_2$O—, —OSiR(O)O, or even O—Si(O)(O)O— where R is an alkyl group. Suitable compounds therefore include tetraalkyloxysilane such as tetraethoxysilane, dialkyldialkoxy, trialkoxyalkyl silanes. It is also envisaged that disilanes can be used.

A particular embodiment of interest envisages the use of an amino functional alkoxysilane as a second compound in the formation of gels of the disclosure. Amino groups may be of formula NHR$^2$ where R$^2$ is C$_{1-6}$ alkyl. Again, the amino group may be separated from the silane functionality by a linker e.g. as defined for L above.

The silane can then be of formula (A), (B) or (C) above. The amino group itself does not react with gelatin but it can react of course, with an epoxysilane to generate a disilane. By using epoxysilane and aminosilane in combination therefore, we generate large addition linker species. As these are incorporated into the gelling network, even higher melting points can be achieved.

Moreover, the addition of an amino silane compound aids the formation of a crosslinked network on the ceramic surface and hence adhesion between ceramic and gelatin.

A further benefit of the use of epoxides is that the epoxide itself can also hydrolyse to give a dihydroxy compound. That is then inert as a reactant with gelatin but it can act as a "bridging group" to form a network on a ceramic surface.

Enzymes

The disclosure, in some examples, also envisages the use of certain enzymes, in particular, microbial transglutaminase (TGA) as a cross-linker. TGA is a thiol containing enzyme which catalyses the reaction of lysine residues with glutamine to form amide crosslinks. It does not require calcium or magnesium as cofactors for its activity. It is available under the trademark Activa WM from the Ajinomoto Corporation as a powder containing 100 micro/g of enzyme dispersed in cyclodextrin.

The enzyme is believed to catalyse a crosslinking reaction between a free amine and an amide present within the gel being crosslinked. The result is the formation of an amide linkage with production of ammonia. This is shown in scheme 1:

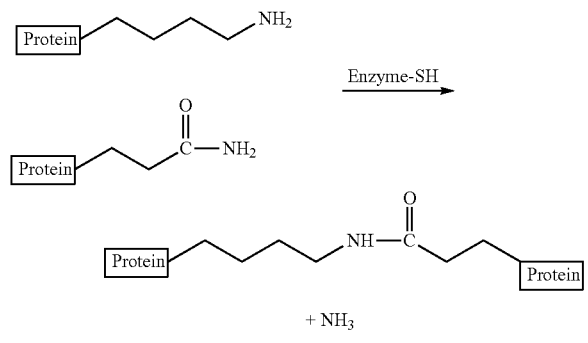

Thus, in a further embodiment, the inventors have found that valuable gels can be formed by crosslinking the gelatin using an enzyme, such as TGA.

In general, any enzyme capable of catalysing this reaction may be used in the present disclosure. Other enzymes of interest are based on laccases, peroxidases and other tyrosinases. In a further embodiment, enzymic crosslinking can take place in the presence of a phenol or polyphenol.

Moreover, enzymes could be used to bind aminosilane to gelatin, e.g. using TGA. As noted above, aminosilanes offer a further benefit in terms of cross-linking.

One benefit of enzymic cross-linking is that the process can be carried out at very low temperature, e.g. 20° C. or less.

Metal Ions

A further alternative strategy involves the use of transition metal ions, lanthanide metal ions or Al ions as the basis for cross-linking agents. The use of transition metals or Al ions is especially preferred. Suitable ions therefore include Cr, Al, Ti, Zr, Fe, V, especially Al and Cr ions. Mixtures of ions may also be included. Metal ions used may be in any oxidation state, such as 3+ or 4+. It may be that the metal ion in the anion/chelate used is added in a different oxidation state than is desired but is then reduced to a desired oxidation state. That reduction reaction might take place after addition to the gelatin.

The metal ions are provided with an anion or chelate which is capable of forming two or more links in the gelatin structure. Preferably the anion or chelate used should not degrade. It is also preferred if the anion or chelate forms a water soluble complex with the metal ion. This makes crosslinking using that species easier.

The anion or complex used can be one that forms a cross-link in the formed gel. Suitable anions include oxides, sulphates, phosphates, nitrates, nitrites or sulphites.

Other anions of interest might react more slowly and in particular, the use of oxygen based organometallic compounds is envisaged. Such compounds may be those based on carboxylic acid groups, RCOO— or compounds with multiple carboxylic acid groups. Suitable carboxylic groups include acetates, adipinate, sulfophthalate, succinate, tartrate, glycolate, phthalate, sulfosalicylate, maleinate, malonate, lactate, citrate, resorcinylate, or oxalate.

In general, the anion used is one which binds strongly to the metal ion. Ideally the anion should form a bridged structure.

Gels crosslinked with metal ions often have melting points at least 10° C. higher than conventionally cross-linked gelatin equivalents, e.g. using a standard bifunctional crosslinking agent.

It is particularly preferred if a chrome alum or ammonium alum is used a source of chromium and aluminium ions. Ideally therefore the Cr and Al are provided in the form of a salt such as CrO$_4^{2-}$ or Al(SO$_4$)$^{2-}$ or Cr(SO$_4$)$^{2-}$. Any counterion can be used such as an alkali metal or ammonium. The use of sodium, K or ammonium is preferred.

In this form, chromium and aluminium form oxygen bridged complexes with carboxyl groups in gelatin. The terms "olation" and "oxolation" are used to describe this phenomena for chromium.

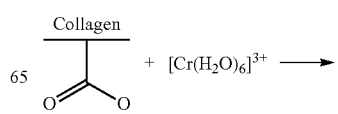

-continued

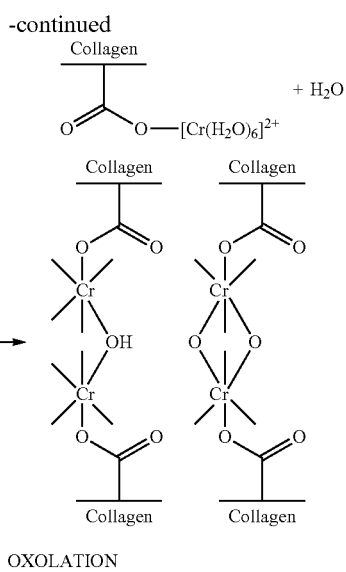

OXOLATION

In the presence of bidentate anions such a sulfate, ions such as chromium can form polynuclear crosslinks with long spacer arms which "self assemble" to form bridges of 2 or more chromium ions:

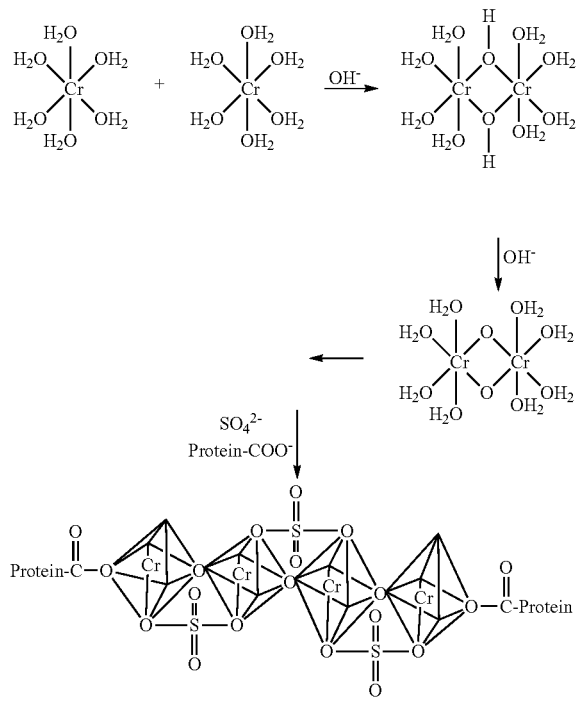

It is preferred if the Cr used is in the $Cr^{3+}$ oxidation state as this appears to form the best cross-links. $Cr^{3+}$ can be added directly, as in the alum or can be generated in situ by reduction, e.g. of $Cr^{6+}$. This can be achieved using a metabisulfite compound such as $Na_2S_2O_6$ as a reducing agent for chromate (VI).

$$3CrO_4^{2-} + 2HSO_3^- + 10H^+ \rightarrow 3Cr^{3+} + 2SO_4^{2-} + 12H_2O$$

The use of the reducing agent has the benefit of enhancing the setting time in the mould. Also, $Cr^{6+}$ does not react with gelatin allowing a homogeneous mixture to be prepared with the gelatin. On reduction, crosslinking occurs.

Other reducing agents can also be used. The use of light as a reducing agent for Cr6+ is also envisaged. Gels in which light is used as a reducing agent have been found to possess remarkably high melt temperatures, even higher than those made using bisulphite reduction.

It is most preferred therefore if cross-linking in these embodiment is achieved using Cr as the metal ion and more specific via the generation of Cr3+ through a reduction of Cr6+ in the actual gel.

Addition of the reducing agent can be effected in a variety of ways. In its simplest embodiment, it can simply be added to the gel and allowed to diffuse therethrough. Alternatively, it could be added as a component of another part of the armour and allowed to diffuse into the gel. The reducing agent might be microencapsulated, e.g. in alginate gels and added to the system. Even powdered metal could act as a slow reducing material.

It is most preferred however if the reduction of the Cr takes place in the gel as opposed to in liquid form.

To increase the strength of gels made using Cr ions further, sulphate ions can be added separately, e.g. in the form of a sulphate salt. Addition of sulfate to the gels increases gel strength as the sulfate facilitates the formation of polynuclear bridged structures illustrated above. Thus the addition of magnesium sulphate can be used to increase gel strength.

Metal ions are typically added as part of a solution, e.g. of water. Molarities of up to 1M may be employed. Good results are achieved a low levels of cross-linker addition, e.g. 0.0001 to 0.01 wt % of the metal salt in question. In general, higher levels if the metal ion give higher melting points.

The amount of sulphate added may also be in the range 0.0001 to 0.01 wt %.

Gel Formation

Mixing of the water, gel and cross-linking agent can be achieved by any convenient means, preferably with stirring or sonication to ensure complete mixing. Typically, the gelatin is first mixed with water to form a gel. In order to ensure mixing, the water is typically heated at this point. The temperature to which the water is heated is preferably at least 50° C. The water should not however be so hot as to denature the gelatin. Temperatures up to 90° C. could be employed.

It is normal to add any additives which are required at this point so that the additives are present in the mixture before cross-linking occurs.

The gel can then be mixed with an appropriate amount of the cross-linking agent. That too is typically supplied as part of a solution, e.g. with water. The addition of the cross-linking agent to the water gelatin mixture preferably takes place at a temperature above ambient but no so high that the whole gel melts. It will be appreciated therefore that the gelatin is preferably in gel form when the crosslinking agent is added as opposed to in liquid form.

Temperatures of 40 to 90° C. are appropriate, such as 50 to 80° C. Ideally therefore once the gelatin and water have been mixed and any additives required added, the cross-linking agent can be added without cooling the water.

It is preferred if pH is controlled during the formation of the cross-linked gel. Ideally, the pH of the gel is controlled to between 4 and 8, such as 5 to 6.5, more preferably 5 to 6, such as 5.5 to 5.8. The control of pH can be maintained using addition of acids/bases such as HCl and NaOH.

The nature of the crosslinking reaction is interesting. It is envisaged that after crosslinking agent addition, a reaction occurs between the gelatin and the epoxide.

If the gel is allowed to cool after mixing then for 2 or 3 days, the gel could in theory be remelted. After 2 or 3 days the cross-linking reaction completes, however, and the gel is not remeltable.

It is thus most preferred if an epoxysilane reacts with gelatin and "grafts" thereon. We observe that the addition of the functional silane does not lead to an immediate increase in viscosity suggesting therefore that what happens is not an immediate crosslinking reaction. What is occurring is a simply addition reaction with the gelatin reacting with the functional group on the functional silane.

The product at this stage gels on cooling but when reheated, it remelts. This can be carried out for a few days and each time the reset gel is indistinguishable from the gel before. This suggests that the gelation is reversible and hence non covalent. The interactions are probably based on hydrogen bonding.

Crosslinks however slowly form in the gel over the next few days (if it is not remelted) in the gel phase. The result is a crosslinked gel which does not remelt with a much higher melting point. Crosslinking therefore takes place over an extended period.

Manipulation of the functional silane allows the crosslinking process to be controlled. Adjustments in length, and branching structure on the functional silane affect the melting point of the gel. The addition of further silanol precursors affects the final properties and so on.

Cross-Linked Gel Properties

It is preferred if the melting point of the cross-linked gel is at least 60° C. Gels do not have proper melting points so these temperatures reflect the temperature at which the gel flows, i.e. a gel-sol transition.

Preferred gels of the disclosure are initially remeltable. Thus for a short period of time after preparation, the gels can be melted. However, after a longer period, such as 3 days or more, sufficient reaction occurs that the gel ceases to melt. This means herein that the gels can be heated to 60° C. without melting.

The cross-linked gels can be formed into any shape to act as a pressure impulse mitigating barrier, i.e. an armour. Often, the gels are formed into sheet like structure. It will be appreciated that it is easiest to form the gel into the desired shape e and then allow it to crosslink.

The pressure impulse mitigating barrier of examples of the disclosure may be formed to carry an array of protrusions, e.g. hemispherical protrusions, formed from the gel. The barrier may therefore have a structure akin to bubble wrap where a plurality of hemispherical air filled protrusions are present on a sheet of plastic. In examples of the present disclosure however, the protrusions are formed from the gel and are therefore solid. By solid therefore is meant that the protrusions are not gas or liquid filled, rather they are formed from the gel.

The protrusions need not be hemispherical (although this is preferred), any suitable shape is employable, e.g. rectangular, hexagonal or triangular protrusions or mixtures of differently shaped protrusions. The person skilled in the art will appreciate that a protrusion need not be a perfect hemisphere, square etc. Hemispheres may be more hemiovoid in shape, be carapace shaped or may become flattened slightly so as to form a more cylindrical or conical shapes. These will all fall within the scope of the term hemisphere however.

The protrusions can be present on both sides of a gel barrier but are preferably present on one side of the barrier only. This allows a flat side to present which can be adhered to a substrate. It is possible therefore to adhere two single sided pressure mitigating barriers to either side of a supporting substrate, e.g. a fibreglass layer or ceramic tile, to form a barrier in which protrusions are present on both sides of a supporting substrate.

The protrusions are preferably arranged in a regular array, i.e. the pattern of the protrusions repeats in some fashion. Typically therefore the pattern may involve straight lines of protrusions or preferably a hexagonal array. Ideally therefore, the barrier comprises a regular two-dimensional array of protrusions. In particular, where the protrusions are hemispherical, they pack in a hexagonal geometry.

The dimensions of the protrusions can vary over broad limits but they may be of the order of 0.1 cm to 50 cm, e.g. 0.5 to 10 cm, preferably 0.75 to 5 cm, about 1 cm at their broadest diameter (e.g. diagonally for a square or rectangular protrusions). The protrusions might be 0.1 to 25 cm in maximum height, e.g. 0.5 to 10 cm. It will be possible to use a mixture of differently sized protrusions, different patterns and/or differently shaped protrusions although it will be appreciated that making all the protrusions identical in the same pattern makes manufacture easier and is therefore preferred.

The gel sheet on which the protrusions form can be made as thick or thin as desired. The sheet may however be 0.1 to 50 cm, e.g. 1 to 10 cm in thickness. It will also be possible to vary the thickness of the sheet along its length so that thicker areas are present in areas where particular protection is needed. The nature of the protrusions could also be graduated, e.g. with large protrusions in certain areas and smaller protrusions elsewhere or perhaps areas of protrusions and areas of simple planar gel sheet.

The gel barriers of examples of the disclosure can be flexible and can be made curved if necessary. It may prove advantageous for example, to use a concave or convex barrier or one which is waved. Such curved barriers may be essential when fitting the barrier on curved surfaces.

The gel mixture can be formed into the shaped barriers which mitigate the effects of explosion or the effects of contact with a projectile using moulds. A hot water gel mixture need simply be poured into a mould comprising the necessary indentations to form the protrusions in the gel.

It is also an advantageous feature of the disclosure that this shaped water gel pressure impulse mitigation barrier can, in some examples, be transparent.

Disruptor Particles

The gel alone acts as an excellent pressure mitigating barrier but to improve performance further, the gel layer can be combined with other armouring type layers to provide further strength. In a further aspect of examples of the disclosure, a gel layer is combined with at least one layer comprising a plurality of disruptor particles. By disruptor particles is meant irregular or preferably regular shaped particles, e.g. spheres of material, which can be used in conjunction with the gel layer to form an even stronger barrier. The disruptor particle layer is preferably embedded within a gel layer or may at least be in contact with a gel layer.

It has been surprisingly found that a gel layer in combination with a disruptor particle layer gives rise to still further improvements in pressure impulse mitigation. The disruptor particles may be formed from a wide variety of materials such as fibreglass, graphite, stone (sandstone, quartz, basalt, flint, pumice), metals (steel), glass (e.g. hollow spheres of glass) but are preferably ceramic particles.

By ceramic is meant inorganic non-metallic material such as alumina, beryllia, steatite or sterite, whose final characteristics are produced by subjection to high temperatures, e.g. in a kiln. Often the ceramic material derives from clay.

Ceramic particles of use in examples of the disclosure may be manufactured as is known in the art although preferably these are formed from aluminium oxide or silicon nitride. Aluminium oxide ceramic particles may be at least 98%, e.g. at least 99% alumina and may have a Vickers hardness of at least 1300, e.g. at least 1700 Hv. They may also have a modulus of elasticity of 300 to 400 kNmm$^{-2}$, e.g. 350 kNmm$^{-2}$, a fracture toughness of 10 to 20 MPam$^{-2}$, e.g. 13.5 MPam$^{-2}$ and an ultimate compressive strength of 1 to 5 kNmm$^{-2}$, e.g. 2.5 kNmm$^{-2}$.

Silicon nitride ceramic balls ($Si_3N_4$), may comprise between 80 and 90%, e.g. 87% silicon nitride and may have a Vickers hardness of at least 1300, e.g. at least 1400 Hv, such as 1400 to 1700 Hv. They may also have a modulus of elasticity of 250 to 400 kNmm$^{-2}$, e.g. 310 kNmm$^{-2}$, a fracture toughness of 4 to 10 MPam$^{-2}$, e.g. 6 to 8 MPam$^{-2}$ and an ultimate compressive strength of 2 to 7 kNmm$^{-2}$, e.g. 4 kNmm$^{-2}$.

Both aluminium oxide and silicon nitride are inert, non-toxic and essentially unaffected by heat (they will function at temperatures of greater than 1000° C.) making them ideal for use in the barriers of examples of the disclosure. Ceramics also weigh considerably less than steel, typically 50% less. Thus for example, aluminium oxide ceramics have a density of approximately 3.8 to 3.9 g/cm$^3$, and silicon nitride ceramics a density of around 3.2 to 3.25 g/cm$^3$. In contrast steel has a density of the order of 7.8 g/cm$^3$. The use of ceramic disruptor particles as opposed to steel particles is therefore of significant benefit in terms of barrier weight. Thus, a barrier with the same performance as steel can be prepared using the water gels of examples of the disclosure at much lower weight.

Moreover, the Vickers hardness index of steel is around 700 to 800 Hv and is therefore approximately 50% less than that of the ceramics discussed above.

The size of the disruptor particles may vary over a broad range. Preferred diameters range from 1 mm to 50 mm, preferably 1 to 25 mm, e.g. 5 to 15 mm, especially 10 mm. It may also be possible to use particularly small disruptor particles of the order of 10 to 1000 microns in diameter. Such miniature particles are generally hollow ceramic spheres (e.g. formed of sodium borosilicate).

Preferably the disruptor particles are regularly shaped so that they pack using a minimum amount of space. Suitable shapes therefore include cubes and cuboids, a honeycomb type structure or spherical structures, e.g. ovoid or spheres. The particles are preferably spherical.

Since the disruptor particle layer may be embedded in the water gel layer, where spheres are employed as disruptor particles, due to the way spheres pack, this may lead to a barrier surface comprising a plurality of hemispherical protrusions as hereinbefore described.

In a particularly preferred embodiment therefore, examples of the disclosure provide a pressure impulse mitigating barrier comprising a plurality of ceramic balls embedded in a gel layer wherein the surface of the barrier comprises a regular two-dimensional array of protrusions formed from said water gel.

A number of disruptor particle layers can be present to maximise pressure impulse mitigation. It is preferable, for example, if 3 to 10 layers are utilised, e.g. 3 to 5 layers.

Again, where spheres are used as the disruptor particles, these will pack to form a hexagonal layered structure as is well known.

The use of disruptor particles in the barrier of examples of the disclosure has many advantages. Firstly, when the barrier absorbs an impact, the disruptor particles crush to a powder rather than splinter. Conventional armour materials are known to splinter under high impact. Whilst the bullet may therefore be stopped, damage to personnel can still occur through splintering of the pressure mitigating material. The use of ceramic balls minimises this hazard since no splintering occurs.

Moreover, the powdered ceramic disruptor particle is held within the water gel matrix.

Also, by using a plurality of small disruptor particles as opposed to a continuous layer of material, e.g. a ceramic tile, the barrier remains stronger after initial impact, or has superior "multi-hit" capability. When using a solid continuous layer in conjunction with a water gel, e.g. a ceramic tile as opposed to ceramic spheres, a larger portion of the barrier may be weakened after a first impact. The pressure impulse of the first impact is believed to be transmitted throughout a portion (e.g. a circle of diameter radius 10 cm) of the continuous barrier weakening therefore a large portion of it. This effect is also observed when a plurality of tiles are used. Thus, a fracture caused by an impact can be transferred from tile to tile extending the area of damage in the barrier and hence weakness significantly beyond the initial impact point.

For disruptor particle based layers, the damage is very localised meaning that the rest of the barrier remains integral and capable of absorbing further impacts.

Moreover, the gel-disruptor particle system is inherently flexible. The use of a hard continuous barrier to improve pressure impulse mitigation would result in a non-flexible barrier of more limited application than a flexible material as proposed herein.

The use of disruptor particles in combination with a gel may also allow miniaturisation of the barrier for applications to protect small but vital components of aircraft, rockets, missiles etc. Thus, ceramic balls of 1 to 5 mm, e.g. 2 to 5 mm, in diameter could be used as disruptor particles preferably along with a cross-linked gel to form a light pressure impulse mitigating barrier.

The layer or layers of disruptor particles are preferably towards the surface of the barrier which receives the first impact.

The barrier of examples of the disclosure may also comprise multiple layers in addition to any disruptor layer. Layers of gel can therefore be mixed with other layers of optionally cross-linked optionally shaped gel with differing concentrations of gel and/or with other pressure mitigating materials to form composites. In one embodiment therefore, the method of the disclosure may involve a barrier comprising a number of layers of cross-linked water gel. Moreover, in such a design, the outside cross-linked gel layer may have the highest concentration of gel with decreasing lower concentrations of gel on the inside of the barrier.

Any barrier of this disclosure may additionally comprise other non gel layers, for example, a polymer layer (e.g. a polyethylene (LDPE, LLDPE, HDPE), polypropylene or polycarbonate layer), a metal layer (aluminium or steel), a fabric layer (cotton), a fibreglass layer, a dilatant layer (e.g. polyethylene glycol layer), a ceramic layer or a silicone layer, a graphite layer, graphite/epoxy composite layer, glass/epoxy composite layer, cyanate ester layer resin composite (e.g. aromatic cyanate ester) or mixtures of such layers. A fibreglass layer and/or a ceramic layer is especially useful. Moreover, it is within the scope of the disclosure to, in some examples, overlap layers to maximise strength. For example, a barrier comprising a ceramic layer might be less strong where separate ceramic tiles are joined to form the layer. By overlapping layers of ceramic material (like when using building bricks and mortar) these weaknesses can be eliminated.

A dilatant is a material which thickens upon applied shear stress, e.g. may turn solid upon applied shear stress and examples thereof are polyethylene glycols and silicones.

Where a multilayer structure is employed it is preferred if the layers are in contact with each other, i.e. there are no gaps between the layers.

The thickness of additional layers can of course vary depending on the nature of the material involved. Suitable thicknesses range from 0.1 to 20 cm.

Layers of fire retardant material, layers of material impervious to chemicals, radioactivity or biological agents could also be added to the barriers of the disclosure, in some examples.

Thus, the number of layers employed in the barrier of the disclosure can be high. Moreover, non gel layers can be set in gel to improve the homogeneity of the barrier. Thus, fibreglass layers may be set in gel.

All layers of the pressure impulse mitigating barrier can be encapsulated in a suitable container if required, e.g. a polymer container such as a polypropylene container, for ease of transport and storage, although this is not essential.

In fact a further advantage of examples of the disclosure is that the material itself can be transported in non-aqueous form, e.g. powder form, and made up to the gel when required, e.g. using a cross-linker as described above. A potential difficulty with the water gels may be their weight but the fact that the material can be transported as a powder and made into the gel only when required is a major advantage.

Ceramic Tile Layer

The barrier of examples of the disclosure can be used in conjunction with a continuous ceramic tile layer in order to improve its strength. The word continuous is used here to distinguish a ceramic layer based on particles which might be ceramic but is not continuous. The ceramic tile layer is formed from one or more ceramic tiles which are arranged to as to form an essentially continuous sheet of ceramic across an armour panel. The materials which can be used in such a ceramic tile are the same as those which can be used to make disruptor particles discussed below.

Examples of ceramic materials that are suitable for use in forming ceramic tiles are aluminium oxide, zirconia toughened alumina, precipitation strengthened alumina, magnesium oxide, SiAlON (Silicon oxy-nitride), silicon carbide, silicon nitride, silicon oxide, boron carbide, aluminium borides, boron nitride, titanium diboride or more generally from a group of oxides, boride, carbides, nitrides of alkaline earth, Group IIA, IIIB, IVB and transition metals and mixtures thereof.

In addition, a metal matrix composite containing a ceramic phase is also suitable. The use of carbides and in particular SiC is especially preferred.

The density of the ceramic is an important factor in determining its strength. For example, alumina ceramic material is formed into ceramic tiles that have a density greater than 3.5 g/cubic centimeter (cc), with density ranging from 3.8 g/cc to 3.97 g/cc (or between 95 and 99.9% of theoretical density) being preferred. Other ceramic materials' densities are even lower than that of alumina. For instance, relatively pure (>99%) SiC has a density of about 3.2 g/cc and boron carbide has density even lower than that of SiC which is about 2.8 g/cc. The ceramic density may be in the range of 1.5 to 5 g/cc.

Ceramic tiles having areal density ranging from about 10 to 25 kg/m$^2$ are preferred. Suitable ceramic tiles can be prepared according to methods known to those skilled in the art, such as by compression moulding and sintering or hot pressing. The nature of the specific threat will determine a range of areal densities needed for a particular type of armour.

By adopting the strategy of deflection using a disruptor particle layer described above areal densities of the armour of examples of the disclosure can be significantly lower (<50%) than that of rolled homogenous armour (RHA) needed to defeat identical threat level. The sectional or more granular nature of the proposition gives it comparable multi-hit capability to RHA, which is often cited as one of the main merits RHA has over other armour systems, particularly ceramic systems.

Tile dimensions can vary. It can be considered that the more joints there are in a tile layer, the more areas of potential weakness however, the presence of joints prevents crack propagation in a tile layer once impact occurs. It is preferred therefore to use a plurality of tiles to make up the tile layer as a whole and not just a large single tile. Tiles can be 5 to 20 cm in either dimension.

Tiles preferably are 3 to 20 mm in thickness, preferably 4 to 10 mm in thickness. It will be appreciated that thicker tiles tend to mean stronger tiles but extra weight. The idea here is to maximise strength whilst minimising weight. The dimensions above are a compromise therefore between strength and weight.

It will be appreciated that any layer may be adhered to another using an adhesive such as an epoxy resin.

The overall thickness of the pressure mitigating barrier may vary depending on the nature of the barrier, e.g. whether it is being used to protect windows, personnel, buildings etc. However, suitable thicknesses are in the range 0.1 cm to 1 m, e.g. 1 to 50 cm such as 1 cm to 20 cm, preferably 2 cm to 10 cm.

Suitable thicknesses for barriers to be used in building cladding are in the range of 10 to 100 mm preferably 10 to 20 mm. Where the material is used to cover windows suitable thickness is in the range of 10 to 50 mm. When the material is used in clothing suitable thickness is in the range of 10 to 70 mm.

When used to protect against high velocity bullets, thicknesses may be of the order of 5 to 30 cm.

It is a particular feature of examples of the disclosure that the gelatin of the present case can adhere to a ceramic tile. Ceramics have surface hydroxyl groups which can be used to link with the functional silane of examples of the disclosure. The hydroxyl groups of the ceramic can interact with the silane group on the functional silane. In particular, in mildly acidic conditions, the silane hydrolyses to silanol allowing first hydrogen bonds and then covalent bonds to from with the ceramic layer. Covalent bond formation can be caused by the heating.

In a further embodiment, the gels of examples of the disclosure might be combined with a nanofoam such as an aerogel.

The cross-linked gel barrier of examples of the disclosure can be deployed anywhere in need to defence against projectiles of explosion. Thus, gel sheets could be used as building cladding, blast curtains or formed into thin sheets for covering equipment such as computers.

Gels may also be formulated as protective blankets, or clothing for personnel. Thus, the barrier could be in a form to protect the eyes, ears or feet, e.g. as shoes. Temporary structures, in particular temporary military structures, may be covered with this material to mitigate the impact of explosions and projectiles on buildings equipment and personnel.

The gels of examples of the disclosure can also act to disrupt the flight of projectiles, i.e. can act as armour by protecting against bullets etc.

It is envisaged that the gels of examples of the disclosure may mitigate pressure through the shock absorbing characteristics of the gel. Moreover, the gel fibres are envisaged to change the trajectory of a projectile and create drag on the projectile.

The gel may therefore resist the pressure wave of a projectile by absorption thereof. The gel is able to compress expand during shockwave impact and "bounce back" the pressure wave onto the oncoming projectile or shock wave. This action reduces or eliminates the pressure wave created by the projectile and reduces or eliminates the kinetic shock of the projectile.

The gel also reduces the inherent energy of the projectile through slowing the speed of passage of the projectile through the gel and this reduces the projectile pressure wave on the entity being protected by the gel. The gel also focuses the pressure wave of the projectile back along the trajectory of the projectile thereby creating a pressure effect outside the gel layers and shield material.

The barriers are of particular use in the disruption of the flight of projectiles, i.e. can act as armour by protecting against bullets etc.

Projectiles may be in the form of bullets or rockets travelling at speeds that may be up to 1000 meters/second. The disclosure is ideally suited, in some examples, to stopping projectiles with a calibre of 50 mm or less.

Thus, the barriers of examples of the disclosure have a range of applications from bullet proof vests and helmets to replacement for sandbags to protect army personnel from enemy fire. Most importantly, the armour may be used as vehicle armour.

The gels of examples of the disclosure may also have utility in the protection of ships from blast or projectiles. The gels of examples of the disclosure may be used to coat either the inside and/or outside of the ship's hull to thereby act as a pressure mitigant. Where a ship has a double hull, the water gel may be used to coat both hulls or used in the cavity between hulls.

It is also envisaged that ships could be fitted with permanent or preferably temporary skirts to prevent any damage occurring to the hull at all. The skirts would take the form of vertically suspended panels of water gel made as thin as possible to minimise weight. Such skirts may be suspended from the side of the ship, e.g. using wires, and may prevent attacks on a ship's hull from surface to surface missiles, torpedoes, mines, or terrorists in boats. In view of their weight, these skirts could be employed only on areas of the hull where explosive damage could be critical, e.g. at the centre point of the hull where explosive damage may cause the hull to split.

Also, the skirts could be employed temporarily as a ship passes through potentially dangerous waters, the skirts being removed once the ship returns to safer areas.

The water gels can also be moulded to form a protective shell on a vehicle. Military vehicles which carry personnel or equipment are conventionally covered with very thick and hence heavy metal plates to stop incoming small arms fire, rocket propelled grenade rounds, damage from mines and shells. When the water gels of examples of the disclosure are moulded, e.g. with a fibreglass or polyurethane shell it may be possible to manufacture a light, fast vehicle capable of withstanding damage from these threats. 30 cm of water gel material covering a lightweight body that could stop incoming attacks.

It is also envisaged that the gels of examples of the disclosure may protect against heat, flame and fire. By definition, the water gels of the disclosure comprise an aqueous component. For this reason, they are capable of absorbing heat and dousing flame much more efficiently than other pressure impulse mitigation materials. It is a particular advantage of examples of the disclosure that the gel pressure impulse mitigation material simultaneously can act to protect against fire due to its evaporative effects, maintaining lower average surface and/or combustible temperatures for longer.

It is a particular advantage of the material of examples of the disclosure that it is transparent.

The disclosure will now be further described with reference to the following non-limiting examples.

Example 1—Epoxysilane Crosslinker

Step 1—Preparation of Solution A

| Component | Weight (Kg) | % Total |
|---|---|---|
| Gelita Gelatin Bloom 302 | 49.70 | 35.00 |
| Water | 91.16 | 64.2 |
| Methyl Paraben | 0.44 | 0.31 |
| Propyl Paraben | 0.34 | 0.24 |
| Phenoxyethanol | 0.36 | 0.25 |
| Total | 142.00 | 100.00 |

Procedure

Weigh 91 kg of water into a 200 kg stainless steel kettle and heat to 90° C. Cease heating.
Weigh 49.7 kg of gelatin & add to the hot water, whilst stirring, as quickly as possible (without forming lumps)
Add 440 g of methyl paraben and 340 g propyl paraben with stirring.
Add 360 g of phenoxyethanol with stirring.
If necessary, adjust pH to 5.5 to 5.8 with 10% NaOH or 1M HCl.
To adjust the pH upwards by 0.1 pH units approximately 170 g of 10% Sodium Hydroxide is required.
To adjust the pH downwards by 0.1 pH units approximately 210 g of 2M hydrochloric acid is required.
Use immediately for the preparation of Ex 2 below.

Example 2

| Batch size 22.5 kg | | | |
|---|---|---|---|
| Component | % | % Total | Weight (kg) |
| Example 1 gel | 89.0% | 88.89 | 20.00 |
| subtotal | | 88.89 | 20.00 |
| Solution B - Epoxy Silane | 11.0% | | |

-continued

| Batch size 22.5 kg | | | |
|---|---|---|---|
| Component | % | % Total | Weight (kg) |
| Water | | 10.1 | 2.273 |
| Epoxy Silane | | 1.0 | 0.225 |
| subtotal | | 11.10 | 2.498 |
| Totals | | 99.99 | 22.50 |

Step 1—Solution A
Prepare 20 kg of the example 1 gel according to the specifications above.
Heat & stir until a temperature of 65-70° C. is reached
Step 2—Solution B—Epoxy Silane Solution
Weight 2.27 kg of water into a polypropylene container.
Add 225 g of Dynasylan Glymo (3-glycidoxypropyltrimethoxysilane) with stirring.
Stir for 5 minutes.
Step 3—Preparation of Gel.
Add Solution B to Solution A with vigorous stirring.
Continue stirring for 10 minutes at 60-65° C.
The gel should be placed as soon as possible in moulds.
The melting point is greater than 60° C. after 4 days.

Example 3

31% Gelatin with 0.55% Epoxy Silane

| Component | % | % Total | Weight (g) | % of sub solution |
|---|---|---|---|---|
| Solution A - 31% gelatin | 89.0 | | | |
| Gelita Gelatin Bloom 302 | | 31.15 | 350.438 | 34.99 |
| Water | | 57 | 641.250 | 64.02 |
| Methyl Paraben | | 0.35 | 3.938 | 0.39 |
| Propyl Paraben | | 0.265 | 2.981 | 0.30 |
| Phenoxytol | | 0.265 | 2.981 | 0.30 |
| Subtotal | | 89.03 | 1001.588 | 100.00 |
| Solution B - epoxy silane | 11.0% | | | 0.00 |
| Water | | 9.05 | 102 | 81.7 |
| Epoxy Silane | | 0.55 | 6.19 | 4.96 |
| Ethanol | | 1.5 | 16.875 | 13.51 |
| Subtotal | | 11.10 | 124.875 | 100.000 |
| Totals | | 100.13 | 1126.46 | |

Step 1—Solution A—31% Preserved Gelatin
(1) Weigh 350 g of Gelatin.
(2) Weigh 640 g of freshly boiled water.
(3) Add 3.9 g of methyl paraben, 3.0 g propyl paraben & 3.1 g of phenoxytol with stirring.
(4) Slowly add 350 g of gelatin to the hot water whilst stirring.
(5) Allow to stand for 10 minutes.
(6) The mixture forms a rubbery gel on cooling.
(7) Heat to 65-70° C. in a microwave oven or a steam bath before using in step 3
Step 2—Solution B—Epoxy Silane Solution
Weight 17 g of denatured alcohol into a container.
1. Add 6.2 g of Glymo (epoxy silane) to the alcohol with stirring.
2. Add 102 g of water with stirring for 5 minutes. A foggy solution forms which becomes clear as stirring proceeds.
Step 3—Preparation of Gel.
1. Solution A heated to 65-70° C.
2. Add Solution B to Solution A with vigorous stirring.
3. Continue stirring for 10 minutes with heating to 65° C.
4. Pour into molds & allow to cool. A gel with a melting point of 40-45° C. forms.
5. The gel is stable for >6 hours at 50° C. but becomes unusable after 12 hours.
6. The gel has a melting point of 40-45° C. when first poured but after 6-9 days at room temperature (15-25° C.) the melting point increases to above 60° C.

Panels

Alumina tiles (Durafrax™, 90-92% alumina from Saint-Gobain) were arranged on a fiberglass sheet (175 gsm) which had been wetted with freshly prepared epoxy resin. The arrangement was surrounded with a 25 mm thick aluminium frame. The epoxy resin was allowed to set. Two layers of 5 mm ceramic balls were arranged behind the tiles. The arrangement was warmed with heat lamps and hot gel (Example 3 65° C.) was poured up to the level of the ceramic balls. A sheet of pre-cut fiberglass (450 gsm) was placed on the top of the balls. The gel was allowed to soak through the sheet with the aid of a roller. A minimum amount of hot gel was added and then another sheet of fiberglass. The process was repeated until there were 6 layers of gel/fiberglass composite backing the tile/ball face. The composite was allowed to cure over 5 days.

Ballistic Testing Setup

The composites were shot with standard Steel cored 7.62×39 mm AK 47 rounds with an average velocity of 750 m/s and an average energy of about 2.3 kJ. The shots were placed onto the centre of the tiles.

The witness was a second panel with the same composition set up 40-45 mm behind the test panel.

Partial Penetration (PP) of the panel was recorded if the facing tile of the witness panel was not scratched.

The steel core of the projectile was usually located in the first panel or in the air gap between the panels. By definition, the energy absorption was 100%.

Previous studies have shown that 6.5 mm Durafrax alumina tiles mounted in gel composites absorb approx. 1300 J of energy when impacted by 30 cal AK47 projectiles.

Example 4

| 28% gelatin + 2.5 mM Chromium + 3.5 mM $SO_4^{2-}$ Batch size 1250 g | | | | |
|---|---|---|---|---|
| Component | % | % Total | Weight (g) | Final Molarity |
| Solution A - Ex 1 | 80.0% | | | |
| Gelita Gelatin Bloom 302 | | 28 | 350.000 | |
| Water | | 51.36 | 642.000 | |
| Methyl Paraben | | 0.25 | 3.125 | |
| Propyl Paraben | | 0.19 | 2.375 | |
| Phenoxetol | | 0.2 | 2.500 | |
| Subtotal | | 80 | 1000.000 | |
| Other Components | 20.0% | | 0.000 | |
| 2% $K_2CrO_4$ (0.1M) | | 2.50 | 31.250 | 2.6 |
| Water | | 16.55 | 206.875 | |

-continued

28% gelatin + 2.5 mM Chromium + 3.5 mM $SO_4^{2-}$
Batch size 1250 g

| Component | % | % Total | Weight (g) | Final Molarity |
|---|---|---|---|---|
| 25% $MgSO_4·7H_2O$ (1M) | | 0.35 | 4.375 | 3.5 |
| Subtotal | | 20.00 | 243.000 | |
| Totals | | 100.00 | 1243.00 | |

Preparation of Chromated Gel

Add 31.25 g of 2% chromate solution to Solution A with warming and stirring to give a yellow solution.

Add 207 g of water to the yellow solution.

Add 4.4 of 25% $MgSO_4.7H_2O$ Solution to solution A with warming and stirring.

Pour into transparent polypropylene moulds and allow to cool.

The solution forms a yellow gel which is sensitive to light and should be stored in a cool dark area.

Reduction of Chromated Gel with Sun Light

Exposure of the chromated gel to glass filtered sunlight in cool conditions (and frequent turning) over several days changes the yellow colour to a mauve/blue. The depth of the colour change is limited to approximately 1-2 cm.

When the chromate has been completely reacted, the gel has a melting point of 70° C.

Reduction of Chromated Gel with UV Light

Chromated gel was exposed to glass a "black light" compact fluoro globe in cool conditions over several days with frequent changes in the direction of irradiation. The gel changes the yellow colour to a mauve/blue.

The depth of the colour change is limited to approximately 1-2 cm.

When the chromate has been completely reduced, the gel has a melting point of 72° C.

Example 5

Preparation of Chromate Gel

28% Gelatin + 5.0 mM Chromium + 7.0 mM $SO_4^{2-}$
Batch size 125 g

| Component | % | % Total | Weight (g) | % of sub | Final Molarity (mM) |
|---|---|---|---|---|---|
| Solution A Ex 1 | | | | 0.00 | |
| Gelita Gelatin Bloom | | 28 | 35.000 | 35.00 | |
| Water | | 51.2 | 64.000 | 63.99 | |
| Methyl Paraben | | 0.31 | 0.388 | 0.39 | |
| Propyl Paraben | | 0.25 | 0.313 | 0.31 | |
| Phenoxetol | | 0.25 | 0.313 | 0.31 | |
| Subtotal | | 80.01 | 100.013 | 100.00 | |
| Other Components | 20.0% | | 0.000 | 0.00 | |
| 2% $K_2CrO_4$ (0.1M) | | 5.00 | 6.250 | 25.25 | 5 |
| Water | | 14.2 | 17.75 | 70.71 | |

-continued

28% Gelatin + 5.0 mM Chromium + 7.0 mM $SO_4^{2-}$
Batch size 125 g

| Component | % | % Total | Weight (g) | % of sub | Final Molarity (mM) |
|---|---|---|---|---|---|
| 25% $MgSO_4·7H_2O$ | | 0.66 | 0.8 | 3.34 | 7 |
| Sodium Metabisulfite | | 0.1 | 0.125 | 0.51 | 10 mM of |
| Subtotal | | 19.80 | 24.95 | 100.00 | |
| Totals | | 99.81 | 124.96 | | |

Note

Chromated gel is prepared without the reduction step by sodium metabisulfite. In the chromium crosslinked gel the chromate is reduced to $Cr^{3+}$ by metabisulfite. Sulfate is added to aid in the formation of sulfate bridged compounds between gelatin and $Cr^{3+}$.

Preparation of Chromated Gel

Add 6.2 g of 2% chromate solution to Solution A with warming stirring to give a yellow solution.

Add 0.8 g of 25% $MgSO_4-7H_2O$ Solution to solution A with warming and stirring.

Add 17 g of water to the yellow solution.

Pour into transparent polypropylene moulds and allow to cool.

The solution forms a yellow gel which is sensitive to light and should be stored in a cool dark area.

Reduction of Chromated Gel with Sun Light

Exposure of the chromated gel to glass filtered sunlight in cool conditions over several days changes the yellow colour to a mauve/blue.

The depth of the colour change is limited to approximately 1-2 cm.

When the chromate has been completely reacted, the gel has a melting point of 97-100° C.

Chromium Gel Formation by Reduction with Sodium Metabisulfite

Melt 68 g of Chromated Gel in a water bath at 60-70° C. with stirring.

Slowly sprinkle 0.1 g of sodium metabisulfite to the solution with stirring until the yellow colour fades. A concentrated solution in water may be used.

The solution changes colour from yellow to mauve/blue and the viscosity increases dramatically. The solution becomes viscous, stringy and has dilatant properties. Continue stirring and warming until the solution is homogenous.

The hot gel is poured into moulds and allowed to cool overnight.

The resultant gel melts to become a viscous liquid when heated to 70-5° C.

10% Sodium metabisulfite was poured onto approx 65 g of chromated gel in a polypropylene glass at room temperature. The thickness of the gel was approximately 3.5 cm with a diameter of approximately 5 cm.

A zone of reduced gel moved slowly through to the center of the gel at an initial rate of approximately 15 mm/day. After several days the gel changes the colour from yellow to a mauve/blue. The depth of the colour change is limited to approximately 2-3 cm. When the chromate has been completely reduced, the gel has a melting point of 49-51° C.

Example 6

| Component | % | % Total | Weight (g) | % of sub solutions A & B | MWt | Moles |
|---|---|---|---|---|---|---|
| Solution A - Example 1 | 80.0% | | | | | |
| Solution B - Chromate solution | 20.0% | | | | | |
| 2% $K_2CrO_4$ solution (0.1M) | | 2.50 | 31.25 | 12.50 | 194 | 0.0032 |
| Water | | 16.9 | 211.25 | 84.50 | 18 | 11.736 |
| 10% Sodium metabisulfite ($Na_2S_2O_6$) | | 0.6 | 7.500 | 3.00 | 190 | 0.004 |
| Subtotal | | 20 | 250 | 100 | | |
| Totals | | 100 | 1250 | | | |

Gel Formation.

Add Solution B to Solution A with stirring. The solution changes colour from yellow to a mauve shade and becomes viscous over a few minutes.

If necessary the solution may be heated to 60-79° C. to make the solution less viscous.

The hot gel is poured into moulds.

Example 7

| Component | % | % Total | Weight (g) | % of sub solutions A & B | MWt | Moles |
|---|---|---|---|---|---|---|
| Solution A | 80.0% | | | 0.00 | | |
| Subtotal | | 80 | 1000.000 | 100.00 | | |
| Solution B - Chrome Alum solution | 20.0% | | | | | |
| 5% Chrome alum (0.1M) | | 2.50 | 31.25 | 12.50 | 499 | 0.0031 |
| Water | | 17.5 | 218.75 | 87.50 | 18 | 12.15 |
| Subtotal | | 20.00 | 250 | 100.00 | | |
| Totals | | 100.00 | 1250 | | | |

Gel Formation

Dissolve 31.2 g of 5% chrome alum solution* with 219 g of boiling water.

Add 5% chrome alum solution* to Solution A in small batches with mechanical stirring. After each addition the solution becomes viscous and stringy where mixing has occurred. This should be stirred until the solution becomes homogenous, before adding the next portion of chrome alum. If necessary, heat the solution to 60-70° C. to lower the viscosity.

Cast into moulds.

*5% Chrome Alum Solution.

Potassium Chromium sulfate (5.0 g, Technical chrome alum, $KCr(SO_4)_2 \cdot 12H_2O$) was added to 95 g of water with stirring to give a homogenous solution with a mauve colour.

Example 8

| Component | % | % Total | Weight (g) | % of sub solutions A & B | MWt | Moles |
|---|---|---|---|---|---|---|
| Solution A - Ex 1 | 80.0% | | | 0.00 | | |
| Subtotal | | 80 | 1000.000 | 100.00 | | |
| Solution B - Alum solution | 20.0% | | | | | |
| Alum BP | | 0.71 | 8.875 | 3.53 | 474 | 0.02 |
| Water | | 19.29 | 241.125 | 96.47 | 18 | 13.47 |
| Subtotal | | 20.00 | 250.00 | 100.00 | | |
| Totals | | 100.00 | 1250.00 | | | |

Gel Formation

Dissolve 8.87 g of Alum BP (potassium aluminium sulfate, $AlK(SO_4)_2 \cdot 12H_2O$) in with 241 g of boiling water.

Add hot alum solution to Solution A in small batches with mechanical stirring. After each addition the solution becomes viscous and stringy where mixing has occurred. This should be stirred until the solution becomes reasonably homogenous, before adding the next portion of alum solution. If necessary, heat the solution to 60-70° C. to lower the viscosity.

Cast into moulds.

Example 6

| Component | % | % Total | Weight (g) | % of sub solutions A & B | MWt | Moles |
|---|---|---|---|---|---|---|
| Solution A Ex 1 | 80.0% | | | 0.00 | | |
| Subtotal | | 80 | 1000.0 | 100.00 | | |
| Solution B - Chromate solution | 20.0% | | 0.000 | 0.00 | | |
| 2% K2CrO4 (0.1M) | | 2.50 | 31.250 | 12.50 | 194 | 0.0032 |
| Water | | 16.55 | 206.875 | 82.75 | 18 | 11.49 |
| Metabisulfite solution 10% Sodium metabisulfite | | 0.6 | 7.500 | 3.00 | 190 | 0.004 |
| 25% $MgSO_4 \cdot 7H_2O$ (1M) | | 0.35 | 4.375 | 1.75 | 246.5 | 0.004 |
| Subtotal | | 20.00 | 250.000 | 100.00 | | |
| Totals | | 100.00 | 1250.00 | | | |

Note

The chromate is reduce to $Cr^{3+}$ by metabisulfite. Sulfate is added to aid in the formation of sulfate bridged compounds between gelatin and $Cr^{3+}$ Gel Formation.

Add 7.5 g of 10% sodium metabisulfite solution** to Solution A with stirring.

Add 4.4 g of 25% magnesium sulfate solution and stir.

The solution changes colour from yellow to a mauve shade and becomes viscous over a few minutes.

If necessary, the solution is heated to 60-79° C. to make the solution less viscous.

The hot gel is poured into moulds.

Example 10

The following solutions are employed in example 10.
Solution A—Example 1
Solution B—2% Potassium Chromate (2.0 g, $K_2CrO_4$)
Solution C—10% Sodium Metabisulfite Solution (10 g, technical $Na_2S_2O_6$)
Ex10/1 to Ex 10/5 Gel Formation.
Solution A (400 g) was mixed with Solution B according to the table below and then treated with 3 g of solution C
The solution was heated to 60-79° C. to reduce viscosity.
The hot gel was poured into moulds.

| Formulation No | Solution A (g) | Solution B (g) | Gelatin (%) | Cr 3+ (mM) |
|---|---|---|---|---|
| Ex 10/1 | 400 | 0.00 | 34.7 | 0 |
| Ex 10/2 | 400 | 4.00 | 34.6 | 1.02 |
| Ex 10/3 | 400 | 6.03 | 34.4 | 1.53 |
| Ex 10/4 | 400 | 7.92 | 34.2 | 2 |
| Ex 10/5 | 400 | 9.54 | 34 | 2.4 |

Example 11

The following solutions are employed in example 11.
Solution A—Example 1
Solution B—3.2% Ammonium Alum (71 mM $Al^{3+}$) $AlNH_4(SO_4)_2 \cdot 12H_2O$
Ex 11/1 to Ex 11/4 Gel Formation.
Solution B was added to Solution A (300 g) according to the table below in small amounts with mechanical mixing with a spiral mixer. After each addition the solution becomes viscous and stringy where mixing has occurred. This was stirred until the solution became reasonably homogenous, before adding the next portion of alum solution. The solutions were heated to 60-75° C. to make them less viscous. The hot gel was poured into moulds.

| Formulation No | Solution A (g) | Solution B (g) | Gelatin (%) | Al 3+ (mM) |
|---|---|---|---|---|
| Ex 11 | 300 | 0.0 | 35 | 0 |
| Ex 11/1 | 300 | 12.8 | 33.6 | 2.9 |
| Ex 11/2 | 300 | 28.2 | 32.1 | 6.1 |
| Ex 11/3 | 300 | 40.3 | 31.1 | 8.4 |
| Ex 11/4 | 300 | 49.8 | 30.4 | 10.1 |

Example 12

| Component | % | % Total | % | Weight (g) | % of sub solutions A & B |
|---|---|---|---|---|---|
| Solution A - Ex 1 | 94.2% | | | | 0.00 |
| Subtotal | | 94.24 | | 1000.000 | 100.00 |
| Solution B - Chromate solution | 5.8% | 0.00 | | 0.000 | 0.00 |
| 2% $K_2CrO_4$ (0.1M) | | | 2.40 | 25.500 | 41.72 |
| Water | | | 2.30 | 24.4 | 39.88 |
| Metabisulfite solution | | | | | |
| 10% Sodium metabisulfite | | | 0.71 | 7.500 | 12.27 |
| 25% $MgSO_4 \cdot 7H_2O$ (1M) | | | 0.35 | 3.750 | 6.13 |
| Subtotal | | | 5.76 | 61.125 | 100.00 |
| Totals | | 100.00 | | 1061.13 | |

Note
The chromate is reduced to $Cr^{3+}$ by metabisulfite.
Sulfate is added to aid in the formation of sulfate bridged polynuclear chromium complexes which crosslink gelatin in the presence of $Cr^{3+}$ eg Gel Formation by Reduction of Chromate.
Add 7.5 g of 10% sodium metabisulfite solution** to Solution A with stirring.
Add 3.8 g of 25% magnesium sulfate solution and stir.
The solution changes colour from yellow to a mauve shade and becomes viscous over a few minutes.
If necessary, the solution is heated to 60-79° C. to make the solution less viscous.
The hot gel is poured into moulds.

Example 13

| | TGA- Gelatin | | | |
|---|---|---|---|---|
| Component | % | % Total | Weight (g) | % of sub solution |
| Solution A - 35% gelatin | 80.0% | | | 0.00 |
| Water | | 50.6 | 632.500 | 63.28 |
| Gelita Gelatin Bloom 302 | | 28 | 350.000 | 35.02 |
| 10% Sodium Hydroxide | | 1.36 | 17.000 | 1.70 |
| Subtotal | | 79.96 | 999.500 | 100.00 |
| Solution B - TGA dispersion | 20.0% | | 0.000 | 0.00 |
| Water | | 19.7 | 246.250 | 98.30 |
| Activa WM (100 u/g Microbial TGA) | | 0.34 | 4.250 | 1.70 |
| subtotal | | 20.04 | 250.500 | 100.00 |
| Totals | | 100.0 | 1250.0 | |

Solution A 35% Gelatin pH 6.9-7.0
Weigh 350 g of Gelatin.
Weigh 633 g of freshly boiled water into a warm bowl.
Slowly add 350 g of gelatin to the hot water whilst stirring with a paddle.
Add 12-17 g of 10% NaOH to adjust pH to 6.8-7.0.
Allow to stand for 10 minutes under Gladwrap.
Skim the surface to remove desiccated material.
Allow to cool to 55° C. before proceeding.
Gel Formation Using Activa WM
Disperse 4.3 g of Activa WM* in 246 g of warm water (45° C.) to form a milky suspension with no lumps.
Add the suspension to Solution A with vigorous stirring.
Cast into moulds.

Incubate the moulds at 40-50° C. for 1.5-2 hours. The solution gelatinizes during this time.
Allow to cool slowly and stand for 2 days before use.
*Activa WM™
Activa WM™ (AJINOMOTO FOODS DEUTSCHLAND GMBH) contains 81-135 U/g of microbial transglutaminase in maltodextrin powder.

The invention claimed is:

1. A pressure impulse mitigating barrier comprising a crosslinked gel comprising water and gelatin, where the gel has been crosslinked using:
a functional silane compound comprising an electrophilic group, wherein the electrophilic group is not a silane and a group of formula (B)

$$—SiR'_n(OR)_{3-n} \quad (B)$$

wherein R is a $C_{1-10}$ alkyl group, $C_{6-10}$ aryl group, or $C_{7-12}$ arylalkyl group;
R' is $C_{1-10}$ alkyl group or $C_{6-10}$ aryl group, or $C_{7-12}$ arylalkyl group; and
n is 0-1;
said functional silane having an Mw of 800 g/mol or less.

2. The barrier of claim 1, wherein the concentration of gelatin in said crosslinked gel is 25 to 37% wt gelatin in water.

3. The barrier of claim 1, wherein the group (B) has the formula $$—Si(OR)_3$$

wherein R is a $C_{1-10}$ alkyl group, $C_{6-10}$ aryl group, or $C_{7-12}$ arylalkyl group.

4. The barrier of claim 3, wherein R is a $C_{1-6}$ alkyl.

5. The barrier of claim 1, wherein the electrophilic group is an epoxy.

6. The barrier of claim 1, wherein the functional silane compound is of the following formula:

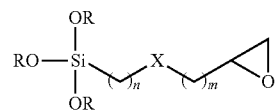

wherein each R is independently a C1-6 alkyl group;
n is 1 to 4
m is 1 to 4; and
X is CH, S or O.

7. The barrier of claim 1, wherein the crosslinked gel has a melting point of 60° C. or higher.

8. The barrier of claim 1, wherein the amount of functional silane added in the gel is from 0.1 to 5 wt %.

9. The barrier of claim 8, wherein the amount of functional silane added in the gel is from 0.5 to 2 wt %.

10. The barrier of claim 1, further comprising at least one ceramic layer.

11. A process for the preparation of a pressure impulse mitigating barrier comprising adding a functional silane as defined in claim 1 to a gelled mixture comprising gelatin and water; and
allowing a crosslinking reaction to take place over a period of at least 3 days so as to crosslink said gel.

12. A method for protecting an entity from the effects of an explosion or from the effects of contact with a projectile, the method comprising covering at least a part of said entity in a barrier as defined in claim 1.

13. The method of claim 12, wherein at least 10% of the entity is covered by the barrier.

14. The method of claim 12, wherein all of the entity is covered by the barrier.

* * * * *